[12] United States Patent
Malmberg

(10) Patent No.: US 7,619,342 B2
(45) Date of Patent: Nov. 17, 2009

(54) ROTOR FOR AN ELECTRIC MACHINE

(75) Inventor: Jukka Malmberg, Helsinki (FI)

(73) Assignee: ABB Oy, Helsinki (FI)

(*) Notice: Subject to any disclaimer, the term of this patent is extended or adjusted under 35 U.S.C. 154(b) by 341 days.

(21) Appl. No.: 11/597,424

(22) PCT Filed: May 27, 2005

(86) PCT No.: PCT/FI2005/000243
§ 371 (c)(1),
(2), (4) Date: Dec. 14, 2006

(87) PCT Pub. No.: WO2005/117235
PCT Pub. Date: Dec. 8, 2005

(65) Prior Publication Data
US 2007/0228858 A1 Oct. 4, 2007

(30) Foreign Application Priority Data
May 27, 2004 (FI) .................................. 20040728

(51) Int. Cl.
H02K 1/27 (2006.01)

(52) U.S. Cl. .......................... 310/156.48; 310/156.52; 310/218

(58) Field of Classification Search ................................ 310/156.48–156.63, 216, 218
See application file for complete search history.

(56) References Cited

U.S. PATENT DOCUMENTS

| | | | |
|---|---|---|---|
| 2,655,611 A | 10/1953 | Sherman | |
| 3,567,974 A | 3/1971 | Spingler | |
| 4,464,596 A | 8/1984 | Miller et al. | |
| 4,469,970 A | 9/1984 | Neumann | |
| 4,689,973 A | 9/1987 | Hershberger | |
| 4,918,831 A | 4/1990 | Kliman | |
| 5,091,668 A * | 2/1992 | Cuenot et al. | 310/156.61 |
| 5,159,220 A | 10/1992 | Kliman | |

(Continued)

FOREIGN PATENT DOCUMENTS

CN 2192975 Y 3/1995

(Continued)

OTHER PUBLICATIONS

International Search Report dated Oct. 18, 2005.

(Continued)

Primary Examiner—Tran N Nguyen
(74) Attorney, Agent, or Firm—Buchanan Ingersoll & Rooney PC

(57) ABSTRACT

The object of the invention is a rotor for an electrical machine (2) formed from layered sheets (5, 22) essentially perpendicular to the rotor's axis of rotation. According to the invention, the rotor comprises at least one first sheet pack (4) that is located close to the central axis of the rotor's revolution and has cavities essentially equal in width to the rotor poles on the side of the rotor's circumference, and at least one second sheet pack (20) that is fitted to the cavity in the first sheet pack and essentially extends to the rotor's circumference, forming the outer surface of the rotor pole. A space (21) extending to the rotor's outer circumference has been arranged between the first and second sheet pack into which permanent magnets (26) intended for the magnetization of the motor are fittable.

9 Claims, 2 Drawing Sheets

U.S. PATENT DOCUMENTS

| | | |
|---|---|---|
| 5,191,256 A | 3/1993 | Reiter, Jr. et al. |
| 2003/0173853 A1 | 9/2003 | Knauff et al. |

FOREIGN PATENT DOCUMENTS

| | | | |
|---|---|---|---|
| GB | 1 324 147 | | 7/1973 |
| GB | 1 552 694 | | 9/1979 |
| GB | 2075274 A | * | 11/1981 |
| JP | 10-285847 | | 10/1998 |
| JP | 2002-369425 | | 12/2002 |
| WO | 00/62399 | | 10/2000 |

OTHER PUBLICATIONS

Finnish Search Report, (Jan. 14, 2005).

* cited by examiner

ROTOR FOR AN ELECTRIC MACHINE

BACKGROUND

The magnetic parts of the stator and the rotor of an electrical machine usually comprise magnetically conductive sheets stacked on top of each other to form a sheet pack. The sheet-type structure ensures a good flow of magnetic flux and prevents the formation of eddy-current losses, for example. A stator and rotor pack manufactured from sheets is preferable in terms of manufacturing technique, because any holes parallel to the motor shaft that have to be arranged in the pack, such as those made for the shaft, winding grooves, cooling tubes and longitudinal fastening bolts, are easy to manufacture by die cutting corresponding holes or cavities in the sheets. Similarly, it is easy to make the circumferential surface of the stator and rotor circular or, if desired, slightly deviating from circular.

In permanent-magnet electrical machines, the permanent magnets are generally fitted to the rotor either by embedding them into the rotor sheet pack or fastening them onto the circumferential surface of the rotor. When the permanent magnet pieces are embedded into the rotor sheet pack, corresponding grooves, as known from prior art have to be made in the sheet pack. Today, efficient permanent magnets are manufactured from neodymium iron boron (NdFeB), which has excellent magnetic properties. Even though it is not as fragile as samarium cobalt that was generally used previously, the handling of permanent magnet pieces made from it and the fitting of them into the designated grooves requires quite a great deal of precision and time. The high magnetic force of new permanent magnets also males their handling more difficult when they are fitted into place in a magnetised state.

The magnetic circuit of the rotor must be dimensioned so that the magnetic flux is routed through an air gap to the air gap of the electrical machine and further to the stator in a way that is as optimal as possible. Simultaneously, the rotor has to be strong enough to bear the loads imposed on it. Because the rotor is a rotating part, its construction must be as light as possible. The sheet pack, comprising magnetically conductive iron sheets, permanent magnet material and any other body structures and the shaft of the rotor must form a sufficiently strong and uniform unit within the completed machine. The machine must also be easy and inexpensive to implement in terms of manufacturing technique.

An electrical machine including a stator and having permanent magnets embedded into the rotor is known from the publication WO 00/62399. However, the solution according to the publication has significant shortcomings with regard to the properties described above.

The purpose of the invention that is the subject of this application is to create a new permanent-magnet motor that is inexpensive and easy to manufacture, with magnetic properties that are competitive and compliant with current requirements. In order to achieve this, the invention is characterised by the features specified in the characteristics section of Claim 1. With regard to other preferred embodiments of the invention, reference is made to the dependent claims.

The solution according to the invention creates a permanent-magnet electrical machine with a rotor that is inexpensive to manufacture. The parts of the rotor can be easily handled during manufacture and conveniently combined with each other. The magnetic sheet pack or partial sheet pack comprising the magnetic circuit of the rotor is an independent compact unit before the permanent magnets are fitted to it. The permanent magnets can be installed and attached in place without the need for special tools. The first sheet pack, which is close to the central axis of the rotor's revolution, is supported by the rotor shaft and extends close to the outer circumference of the rotor between the poles. This creates cavities essentially equal in width to the rotor poles on the side of the rotor's circumference. The poles are formed from other sheet packs fitted in the cavities of the first sheet pack and essentially extend to the circumference of the rotor. This creates the outer surface of the rotor pole. Space remains between the first and second sheet pack, extending to the outer circumference of the rotor with essentially equal width. The permanent magnets intended to magnetise the motor are fitted into this space. Installation is preferably carried out from the outer circumference by pushing the magnets into place.

It is simple to secure the fastening of the permanent magnets in the radial direction of the rotor, and no special tools or parts are required.

According to a preferred embodiment of the invention, the rotor comprises several axial modules. This makes it possible to manufacture even a large motor without any complex arrangements. Modular dimensioning facilitates design and brings benefits in terms of manufacturing technique. Production facilities can be used in a functional way and each permanent magnets can be magnetised separately for each module.

According to another preferred embodiment of the invention, the outer sheet pack facing the rotor's air gap and the inner sheet pack attached to the rotor shaft are made from different types of sheets. The sheets can be chosen on the basis of technical and economical factors related to the different properties particularly suitable for each pack.

According to yet another embodiment, uniform sheets with no openings for permanent magnets are arranged between the partial modules. This makes the mechanical properties of the rotor even better.

DESCRIPTION OF THE DRAWINGS

In the following, the invention will be described in detail by referring to the drawings, where.

DETAILED DESCRIPTION

Figure 1:
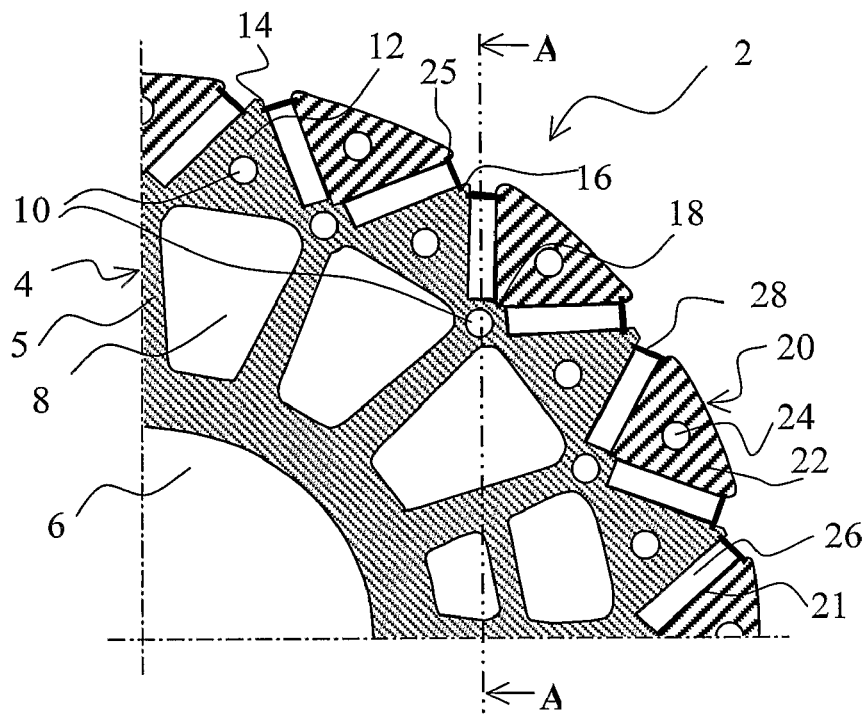
FIG. 1 illustrates the cross section of the rotor.

FIG. 1 illustrates the cross section of the rotor 2 of an electrical machine. For the sake of clarity, the figure only shows a quarter sector of the rotor. An inner sheet pack 4 is formed from magnetically conductive sheets 5 and fitted on the shaft 6. In addition to a hole for the shaft, a number of other holes 8 have been die cut in the sheets of the sheet pack in order to make the structure lighter. Furthermore, holes 10 have been die cut in the outer part of the sheet pack for fitting rods during sheet pack manufacture in order to position the sheets and fasten them to each other in the completed rotor. The outer edge of the inner sheet pack, farthest away from the shaft, has a claw-type structure. The point 14 of each triangular claw 12 extends to the outer circumference of the rotor, close to the machine's air gap. Grooves 16 have been die cut in the immediate vicinity of the claw tip on both sides of the claw. The bottom of the claw has been die cut to form a small projection 18. The sheets of the inner sheet pack 4 have been manufactured from a material such as silicon-alloy iron using a well-known method. The outer sheet packs 20 are formed from triangular sheets 22 layered on top of each other similarly to the sheets of the inner sheet pack. The outer sheet packs 20 form the magnetic poles of the rotor. They are manufactured from the same material as the sheets of the inner sheet pack. The properties of the machine can be further enhanced by using a sheet that is thinner and has better magnetic properties. An inner sheet pack and pole of separate structures allow the reduction of stray flux. Holes 24 have been die cut in the sheets 22 in order to facilitate installation and alignment. The size of the sheets is such that a rectangular cavity 21 remains between the sheets 22 and the teeth 12 in the sheets of the inner sheet pack. The cavity opens towards the outer circumference of the rotor—that is, the motor air gap. A groove 25 has been die cut on both sides of the sheet 22 at the same position as groove 16 in the claw 14. Once the rotor sheet packs 4 and 20 have been assembled, permanent magnet pieces 26 of essentially the same size as the opening will be fitted in the openings 21 remaining between them. The permanent magnet pieces 26 are pushed from the direction of the rotor's outer circumference, after which locking pieces 28 are fitted to the grooves 16 and 25 in the sheet packs in the direction of the rotor shaft. The locking pieces function as closing elements for the openings 21 receiving the permanent magnets. Thus, there are magnets aligned in the rotational direction and the radial direction of the rotor on both sides of each magnetic pole of the rotor. In each magnetic pole, the magnets are in a V arrangement in the axial direction of the rotor.

Figure 2:
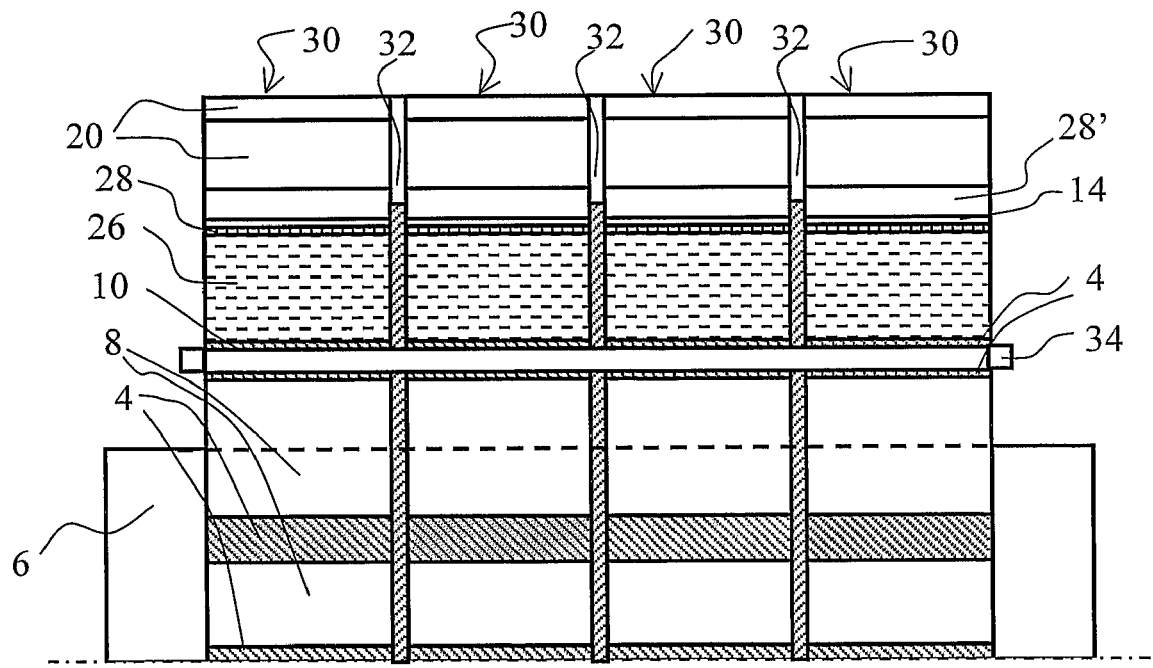
FIG. 2 illustrates a partial cross section of the rotor sheet pack.
Figure 3:
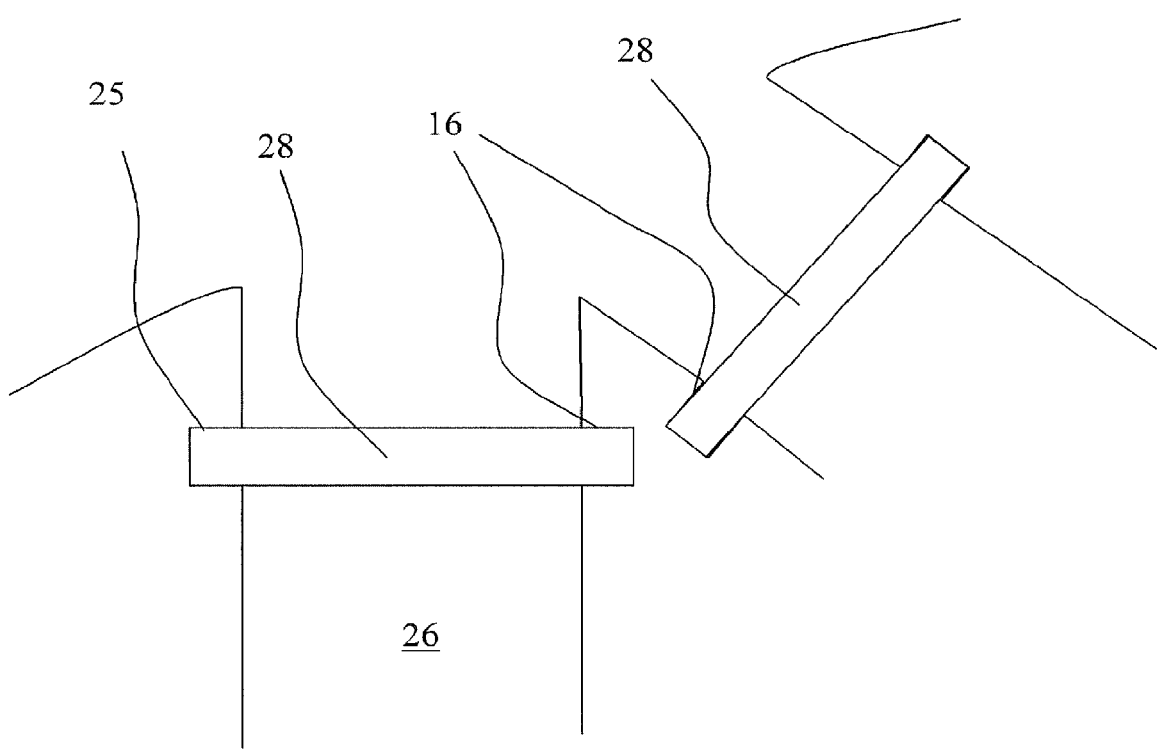
FIG. 3 illustrates a perspective view of opening in the rotor sheet packs.

Rotor modules are formed as illustrated in FIG. 1. There can be one or more of these in a single rotor. FIG. 2 illustrates a partial cross section A-A of the rotor, also indicating its modular structure. The rotor comprises four modules or partial rotors 30 in the axial direction. These are formed of first and second sheet packs assembled as described above. In FIG. 2, the cross section of the rotor goes through one of the magnetic pieces 26, showing the cross section of the locking piece 28 on top of the magnet and, correspondingly, the locking piece 28' of the adjacent magnet viewed from the air gap of the machine.

There are intermediate sheets 32 between the rotor modules, extending from the shaft 6 to the outer circumference of the rotor and separating the rotor modules from each other. Simultaneously, they secure and support the magnets 26 and hold the magnet locking pieces in place. The intermediate sheets 32 have corresponding holes at the location of holes 10 and 24 die cut into the magnetic sheet packs 4 and 20, respectively. The rods 34, only one of which is included in the illustration, extend through the entire rotor. They are used as connection means fastened by bolts from the rotor ends to the rotor end plates in a well-known way (not illustrated).

In the above, the invention has been described by presenting a certain preferred embodiment. However, the above description should not be considered as limiting patent protection; the embodiments of the invention may vary within the scope of the following claims.

The invention claimed is:

1. A rotor for an electrical machine, formed from layered sheets essentially perpendicular to the rotor's axis of rotation, wherein the rotor comprises at least one first sheet pack that is located close to a central axis of the rotor's revolution, wherein plural triangular claws are located on an outer edge of the first sheet pack and each claw has a point that extends to an outer circumference of the rotor near an air gap and is located between cavities essentially equal in width to poles on a side of the rotor's circumference, and at least one second sheet pack that is fitted to the cavity in the first sheet pack and essentially extends to the rotor's circumference, forming an outer surface of the rotor pole, wherein a space extending to the rotor's outer circumference has been arranged between the first and second sheet pack into which permanent magnets that magnetize the motor are fittable from the side of its outer circumference.

2. A rotor according to claim 1, wherein the first and second sheet pack essentially extend to the rotor's circumference and wherein grooves have been arranged along a edge of the sheet packs closer to the circumference for fitting locking pieces for the permanent magnets.

3. A rotor according to claim 1, wherein locking pieces are formed from a steel sheet parallel to a shaft of the rotor that are fittable into grooves arranged along an edge of the sheet packs.

4. A rotor according to claim 1, wherein sheets forming the first sheet pack are essentially thicker than sheets forming the second sheet pack.

5. A rotor according to claim 1, wherein connection means have been fitted in the second sheet pack in order to hold the pack in place in the radial direction of the rotor.

6. A rotor according to claim 5, wherein ends of the rotor have end plates to which the sheet packs can be fastened by means of a shaft and/or connecting means.

7. A rotor according to claim 1, wherein axial modules can be formed from the first and second sheet packs, a full-length rotor being assembled from these modules.

8. A rotor according to claim 1, wherein axial openings have been arranged between the the first and second sheet packs, the axial openings extending to the rotor's circumference and opening towards the circumference, and wherein the permanent magnets are fittable into grooves parallel to the rotor shaft and that the openings can be closed from the side of the air gap using a closing element.

9. A rotor according to claim 1, wherein the permanent magnets are in a V arrangement within the rotor.

* * * * *